(12) United States Patent
Miyaoh

(10) Patent No.: US 6,428,016 B1
(45) Date of Patent: Aug. 6, 2002

(54) METAL CYLINDER HEAD GASKET WITH COMPRESSIBILITY ADJUSTING SLITS

(75) Inventor: Yoshio Miyaoh, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 18 days.

(21) Appl. No.: 09/698,267

(22) Filed: Oct. 30, 2000

(30) Foreign Application Priority Data

Nov. 5, 1999 (JP) .............................. 11-315837

(51) Int. Cl.[7] ................................. F02F 11/00
(52) U.S. Cl. ........................ 277/593; 277/591
(58) Field of Search .................. 277/591, 593, 277/594, 598

(56) References Cited

U.S. PATENT DOCUMENTS 5,382,029 A * 1/1995 Udagawa et al. ........... 277/591
5,879,011 A * 3/1999 Takata et al. ............... 277/593
5,951,021 A * 9/1999 Ueta .......................... 277/593

* cited by examiner

Primary Examiner—Anthony Knight
Assistant Examiner—E Peavey
(74) Attorney, Agent, or Firm—Kanesaka & Takeuchi

(57) ABSTRACT

A metal cylinder head gasket is formed of a metal plate extending substantially throughout an entire area to be sealed. The gasket includes a plurality of first holes for cylinder bores, a plurality of second holes for bolts, a plurality of beads formed in the metal plate to surround the first holes, and a plurality of slits formed in the metal plate to partly surround the beads between the second holes except for an intermediate area between the first holes. Each slit has narrow and wide areas. The narrow area has a width narrower than that of the wide area to adjust compressibility of the bead to thereby securely seal around the first holes.

4 Claims, 2 Drawing Sheets

1

METAL CYLINDER HEAD GASKET WITH COMPRESSIBILITY ADJUSTING SLITS

BACKGROUND OF THE INVENTION AND RELATED ART STATEMENT

The present invention relates to a metal cylinder head gasket with compressibility adjusting slits to adjust a surface pressure of a bead.

A cylinder head gasket is situated between a cylinder head and a cylinder block to securely seal therebetween. In case the cylinder head gasket is made of a metal plate or plates, in order to provide a surface pressure around a cylinder bore for securely sealing around the cylinder bore, a bead is generally formed around the cylinder bore.

On the other hand, recently, an engine has been developed to become compact and have a light weight. Therefore, the space between the cylinder bores is gradually made narrower. For this engine, also, the gasket has to securely seal around the cylinder bores.

In case the beads are formed to completely surround the cylinder bores in the engine with the narrow space between the cylinder bores, even if bolts are tightened to securely seal around the cylinder bores, the beads may not be completely compressed due to the various factors, such as compressibility of the bead, rigidity of the cylinder head or cylinder block, and so on.

In this case, a slit may be formed outside the bead to partly surround the same to thereby control the compressibility of the bead. However, in case the slit is simply formed around the bead, the bead may be relatively easily compressed, but the bead may not properly seal around the cylinder bore.

The present invention has been made in view of the above, and an object of the invention is to provide a metal cylinder head gasket with a bead, wherein rigidity of the bead can be partly controlled to thereby improve the tightening ability of the cylinder head.

Another object of the invention is to provide a metal cylinder head gasket as stated above, wherein the bead can be properly compressed to securely seal around the cylinder bore.

Further objects and advantages of the invention will be apparent from the following description of the invention.

SUMMARY OF THE INVENTION

A metal cylinder head gasket of the invention is used for an internal combustion engine, and is basically formed of a metal plate extending substantially throughout an entire area to be sealed. The gasket includes a plurality of first holes for cylinder bores situated in the metal plate, a plurality of second holes for bolts situated in the metal plate, and a plurality of beads formed in the metal plate to be situated around the first holes for sealing around the same. An intermediate area is situated between two of the plurality of first holes situated adjacent to each other. Also, a plurality of slits is formed in the metal plate to partly surround the beads between the second holes except for the intermediate area.

In the invention, each slit includes narrow and wide areas. The narrow area has a width narrower than that of the wide area to adjust compressibility of the bead to thereby securely seal around the first holes. In comparing the compressibility at the narrow and wide areas, the bead portion near the wide area can be relatively easily compressed than that near the narrow area.

In the invention, since the slit has the narrow and wide areas, although the bead is formed constantly on the metal plate, the compressibility of the bead can be adjusted easily. Thus, the bead can be compressed equally according to the rigidity of the cylinder head.

Each slit includes an outer edge extending substantially along the bead situated adjacent thereto, and an inner edge with steps to form the narrow and wide areas. The outer and inner edges are curved along the bead. Also, the wide area extends toward the bead from the narrow area.

Two narrow areas are located close to the second holes and sandwich the wide area. This form is suitable for a cylinder head with a high rigidity. Namely, since the rigidity of the cylinder head is high, when the cylinder head is tightened, the cylinder head is compressed generally flat without bending upwardly at the middle area between the bolt holes. In this case, the areas near the bolt holes are compressed strongly, so that the wide area is located between the narrow areas.

Two wide areas may be located close to the second holes and sandwich the narrow area. This form is suitable for a cylinder head with a low rigidity. Namely, since the rigidity of the cylinder head is low, when the cylinder head is tightened, the cylinder head is not compressed flat, i.e. an area between the bolt holes is slightly bent upwardly. In this case, if the areas near the bolt holes are compressed strongly, the area between the bolts holes is bent upwardly, so that the wide areas are formed near the bolt holes to allow the bead to bend more easily near the bolt holes. As a result, the bead can be bent generally equally.

The first holes are generally arranged linearly in a longitudinal direction of the gasket. In this case, the slits are formed to sandwich the first holes therebetween generally along the longitudinal direction.

DETAILED DESCRIPTION OF PREFERRED EMBODIMENTS

Figure 1:
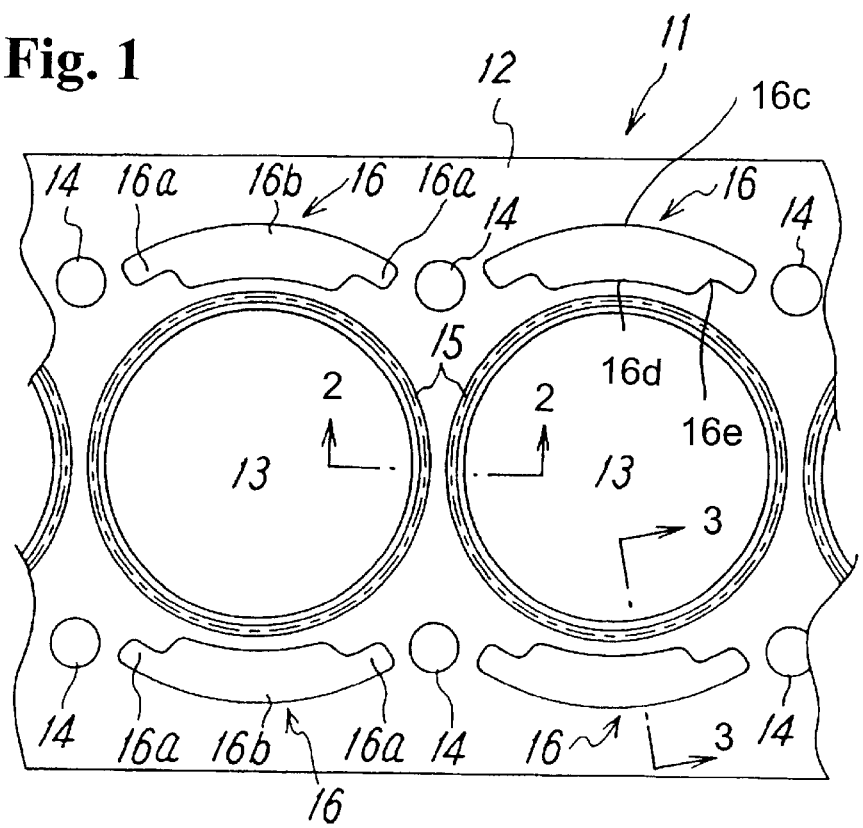
FIG. 1 is a partial plan view of a first embodiment of a metal cylinder head gasket of the invention.
Figure 2:
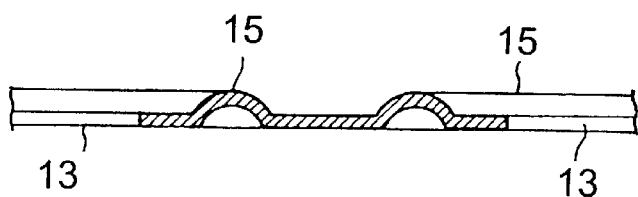
FIG. 2 is an enlarged cross sectional view taken along line 2—2 in FIG. 1.
Figure 3:
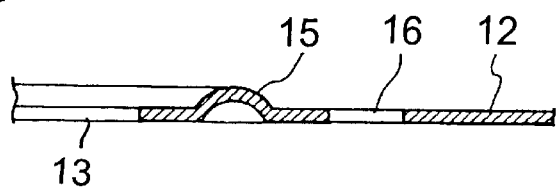
FIG. 3 is an enlarged cross sectional view taken along line 3—3 in FIG. 1.

A metal gasket 11 of the invention is a cylinder head gasket to be situated between a cylinder head and a cylinder block (both not shown). The gasket 11 is formed of one metal plate 12 extending substantially throughout an entire area to be sealed.

The gasket 11 includes a plurality of cylinder bores 13, and a plurality of bolt holes 14 located near the cylinder bores 13 at both sides thereof. The gasket 11 includes water holes, oil holes and so on, as in the conventional gasket, but these holes are omitted in the drawings.

The gasket further includes beads 15 around the cylinder bores 13 to securely seal therearound. Each bead 15 completely surrounds the cylinder bore 13 to provide a surface pressure when the bead 15 is compressed.

In the invention, the metal plate 12 includes slits 16 between the bolt holes 14 outside the bead 15 for partially reducing the rigidity of the bead 15. Each slit 16 includes end portions or narrow areas 16a near the bolt holes 14, and an intermediate portion or wide area 16b between the end portions 16a. Namely, each slit 16 includes an outer edge 16c extending concentrically with the bead 15, and an inner edge 16d with steps 16e. A part of the inner edge 16d located at the intermediate portion 16b is situated close to the bead 15. The steps 16e form the end portions 16a and the intermediate portion 16b.

In this gasket 11, since the end portions 16a are located away from the bead 15, when the gasket 11 is compressed, the bead 15 has resistance stronger than that at the intermediate portion 16b. On the other hand, since the intermediate portion 16b is located close to the bead, the bead 15 near the intermediate portion 16b can be compressed relatively easily.

The gasket 11 is suitable for an engine with a cylinder head which has a relatively strong rigidity. Namely, if the rigidity of the cylinder head is strong, when the cylinder head is assembled with the cylinder block, the cylinder head is fixed to the cylinder block without substantial bending at the middle area between the bolt holes. In this case, the rigidity of the bead 15 near the bolt holes 14 is made strong, and the rigidity of the bead 15 away from the bolt holes 14 is made weak. Consequently, when the gasket is situated between the cylinder head and the cylinder block, and is tightened by the bolts, the bolts can be properly tightened and the bead is compressed relatively equally to securely seal around the cylinder bore 13.

Figure 4:
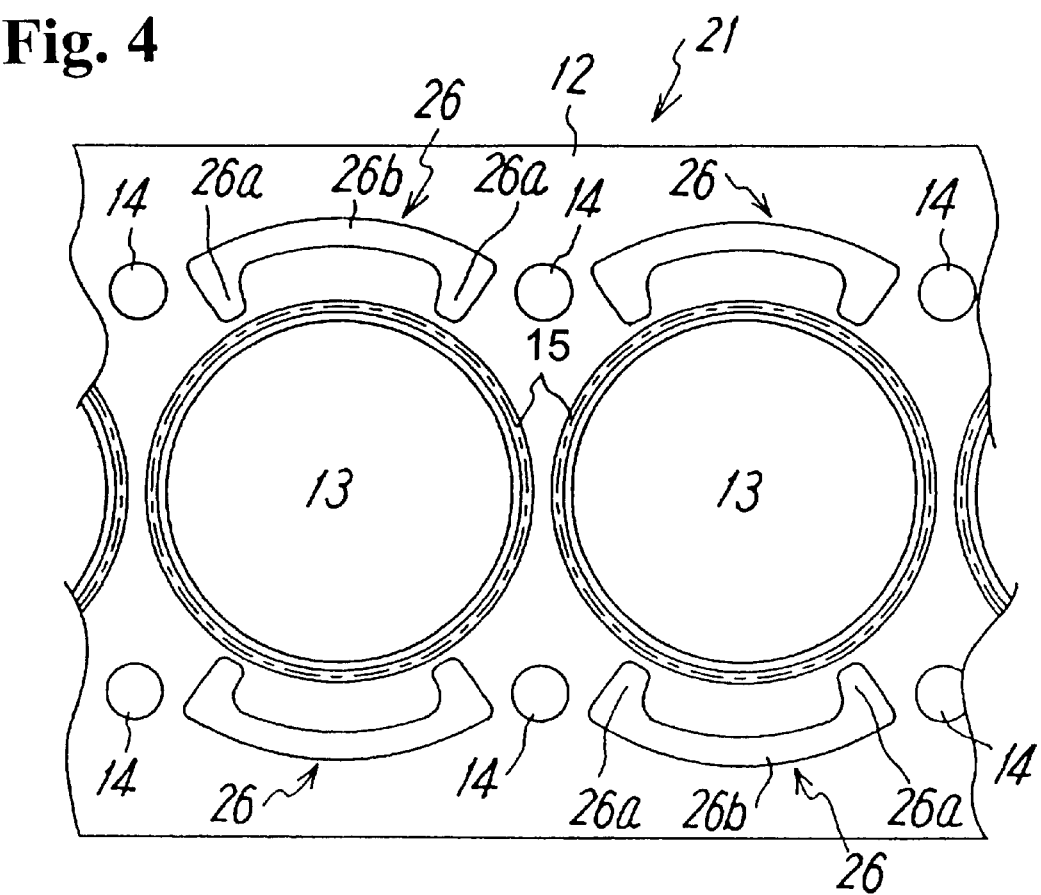
FIG. 4 is a partial plan view of a second embodiment of a metal cylinder head gasket of the invention.

FIG. 4 is a second embodiment of a cylinder head gasket 21 of the invention. The gasket 21 includes cylinder bores 13, bolt holes 14, and beads 15, as in the first embodiment. The gasket 21 also has slits 26 outside the beads 15, but the shape of each slit 26 is different from that of the slit 16 in the first embodiment.

In the gasket 21, the slit 26 has end portions or wide areas 26a close to the bolt holes 14, and an intermediate portion or narrow area 26b between the end portions 26a. The end portions 26a are located close to the bead 15 to allow the end portions 26a to be deformed easily when the gasket is tightened, while the intermediate portion 26b is located slightly away from the bead 15 to provide some resistance to the portion of the bead 15.

The gasket 21 is suitable for an engine with a cylinder head which has a relatively weak rigidity. Namely, if the rigidity of the cylinder head is weak, when the cylinder head is assembled with the cylinder block, the portion between the bolt holes is liable to bend upwardly. In this case, the rigidity of the bead 15 near the bolt holes 14 is made weak, and the rigidity of the bead 15 away from the bolt holes is made strong. Therefore, when the gasket is situated between the cylinder head and the cylinder block and is tightened by the bolts, the bead is compressed relatively equally to securely seal around the cylinder bore 13.

In the above embodiments, the gasket is formed of one metal plate. However, the metal plate may be combined with one or more metal plates to constitute a metal laminate gasket.

In the invention, since the shape of the slits is changed according to the rigidity of the cylinder head, the rigidity of the bead can be adjusted when the gasket is tightened. Thus, the tightening ability of the bolts can be improved, and the bead can be tightened generally equally to securely seal around the cylinder bore.

While the invention has been explained with reference to the specific embodiments of the invention, the explanation is illustrative and the invention is limited only by the appended claims.

What is claimed is:

1. A metal cylinder head gasket for an internal combustion engine, comprising:

a metal plate extending substantially throughout an entire area to be sealed, a plurality of first holes for cylinder bores situated in the metal plate, a plurality of beads formed in the metal plate, each bead surrounding each of the first holes for sealing the same, a plurality of second holes for bolts situated in the metal plate around the first holes outside the beads, at least one intermediate area situated between two of the plurality of first holes situated adjacent to each other, and a plurality of slits formed in the metal plate to partly surround the beads between the second holes except for the at least one intermediate area, each slit having narrow and wide areas, said narrow area having a width narrower than that of the wide area to adjust compressibility of the bead to thereby securely seal around the first hole, each slit including an outer edge extending substantially along the bead situated adjacent thereto, and an inner edge with steps situated at a side opposite to the outer edge to form the narrow and wide areas, said wide area extending toward the bead from the narrow area.

2. A metal cylinder head gasket according to claim 1, wherein two narrow areas are located close to the second holes and sandwich the wide area.

3. A metal cylinder head gasket according to claim 1, wherein two wide areas are located close to the second holes and sandwich the narrow area.

4. A metal cylinder head gasket according to claim 1, wherein said first holes are arranged linearly in a longitudinal direction, said slits extending generally along the longitudinal direction to sandwich the first holes therebetween.

\* \* \* \* \*